(12) United States Patent
Lenzarini et al.

(10) Patent No.: US 12,452,050 B2
(45) Date of Patent: Oct. 21, 2025

(54) METHOD FOR PROTECTING PAYLOAD DATA

(71) Applicant: u-blox AG, Thalwil (CH)

(72) Inventors: Davide Lenzarini, Thalwil (CH); Michele LaManna, Pisa (IT); Carlo Vallati, Pisa (IT); Riccardo Xefraj, Pisa (IT); Pericle Perazzo, Pisa (IT)

(73) Assignee: u-blox AG, Thalwil (CH)

( * ) Notice: Subject to any disclaimer, the term of this patent is extended or adjusted under 35 U.S.C. 154(b) by 180 days.

(21) Appl. No.: 18/356,605

(22) Filed: Jul. 21, 2023

(65) Prior Publication Data
US 2024/0031144 A1    Jan. 25, 2024

(30) Foreign Application Priority Data
Jul. 22, 2022  (EP) .................................... 22186471

(51) Int. Cl.
*H04L 9/40* (2022.01)
*H04L 9/08* (2006.01)
*H04L 9/30* (2006.01)

(52) U.S. Cl.
CPC .............. *H04L 9/0869* (2013.01); *H04L 9/30* (2013.01)

(58) Field of Classification Search
CPC ....... H04L 9/0869; H04L 9/30; H04L 9/3073; H04L 9/0825; H04L 2209/601; H04W 12/0431; H04B 7/18513
See application file for complete search history.

(56) References Cited

U.S. PATENT DOCUMENTS

| | | | |
|---|---|---|---|
| 7,949,135 B2 * | 5/2011 | Lindholm | .............. H04L 9/0836 713/153 |
| 10,212,142 B2 | 2/2019 | Dearlove et al. | |

(Continued)

FOREIGN PATENT DOCUMENTS

CN            106992871            7/2017

OTHER PUBLICATIONS

Extended Search Report in European Appln. No. 22186471.3, dated Jan. 13, 2023, 12 pages.

(Continued)

*Primary Examiner* — Thaddeus J Plecha
(74) *Attorney, Agent, or Firm* — Fish & Richardson P.C.

(57) ABSTRACT

In a method for protecting payload data transmitted via a one-to-many communication channel from a provider device to at least one receiver device a public key set (PK) supporting asymmetric bilinear pairings is generated. A number of receiver device keys (DKi) that are generated based on the public key set (PK) are distributed to respective devices including the at least one receiver device. A provider key (K) is generated based on the public key set (PK) and inter alia on an encryption random number (t) and stored in the provider device. An envelope (ENV) is generated based on the public key set (PK) and on the encryption random number (t) and is distributed, via the one-to-many communication channel, to the respective devices including the at least one receiver device. The at least one receiver device generates a receiver key, which corresponds to the provider key, based on the distributed envelope (ENV) and the distributed receiver device key (DKi). The provider device encrypts and/or signs the payload data employing the provider key (K) for producing protected payload data and distributes them via the one-to-many communication channel to the respective devices. The at least one receiver device (Continued)

processes, e.g. by decrypting and/or authenticating, the protected payload data employing the receiver key.

17 Claims, 3 Drawing Sheets

(56) References Cited

U.S. PATENT DOCUMENTS

| | | |
|---|---|---|
| 2010/0228972 A1 | 9/2010 | Wat et al. |
| 2013/0083924 A1 | 4/2013 | Wei et al. |
| 2018/0167808 A1* | 6/2018 | Somaraju ............... H04L 63/065 |

OTHER PUBLICATIONS

Fujii et al., "Secure Broadcast System with Simultaneous Individual Messaging," IEICE Transactions on Fundamentals of Electronics Communications and Computer Sciences, Jun. 2011, E94-A(6):1328-1337.

* cited by examiner

METHOD FOR PROTECTING PAYLOAD DATA

CROSS-REFERENCE TO RELATED APPLICATIONS

This application claims priority to European Application No. 22186471.3, filed on Jul. 22, 2022, the contents of which are incorporated herein by reference in their entirety.

TECHNICAL FIELD

This disclosure relates to a method for securely transmitting payload data. The disclosure further relates to a provider device, to a receiver device and to a trusted entity that enable secure transmission of payload data.

BACKGROUND ART

In order to make current broadcast communication systems secure, e.g. unidirectional satellite communication, a cryptographic key pair can be established. One part of the key pair remains at the sender while the other part of the key pair is distributed to a set of authorized recipients of the broadcast communication. This way any data transmitted over the broadcast communication channels can be secured with the cryptographic keys derived from the established key pair. However, if one of the recipient's keys is compromised or forwarded to a non-authorized recipient, security is broken. Replacing the keys involves great effort, in particular if only low data rates are available. Furthermore, as the same key is distributed to all recipients, it is impossible to identify which authorized recipient had been compromised or actively forwarded its key to a non-authorized recipient.

SUMMARY OF INVENTION

An object to be achieved is to provide an improved cryptographic concept for securely transmitting payload data with reduced effort, e.g. in a positioning system or in general in a system distributing content with short time validity to a large number of consumers.

This object is achieved with the subject-matter of the independent claims. Embodiments and developments derive from the dependent claims.

The improved cryptographic concept is based on the idea that for securely transmitting data, e.g. payload data, in a one-to-many communication network, instead of directly generating a pair of cryptographic keys securing the communication, a two-step approach is chosen. First, on a server side, e.g. in a trusted entity or in a provider device, a public key set is generated together with a number of receiver device keys that are inter alia based on the public key set. The receiver device keys are distributed individually to respective receiver devices. The public key set can then be used to generate, further based on some random numbers, a provider key and an envelope stored on the server side. The envelope, in particular only the envelope and not the provider key, are distributed to the receiver devices, which are thereby enabled to generate a receiver key based on the distributed envelope and the receiver device key of the specific device. Hence, the server side can protect, i.e. encrypt and/or sign using the provider key, data that is transmitted over a one-to-many communication channel, e.g. in a broadcast or multicast communication network, to the receiver devices. The protected data can be processed, i.e. decrypted and/or authenticated, by each of the receiver devices with their respective receiver keys generated individually on each receiver device.

In this way, once the individual receiver device keys are distributed and used, the actual keys used for protecting data to be transmitted can easily be disregarded and replaced with little effort by creating a new provider key together with a corresponding envelope, wherein only the envelope having a fixed and limited size has to be transmitted to the receiver devices, e.g. via the one-to-many communication channel.

For example, if the public key set is generated with a first repetition rate and the provider keys and envelopes are generated with a second repetition rate that is higher than the first repetition rate, the lifetime, also called crypto period, of a provider key can be limited with little effort. Furthermore, if one of the receiver device keys is disclosed without authorization (intentionally or because of a compromised device), theoretically enabling generation of the receiver key corresponding to the provider key, the source of the compromised key can be identified. This allows e.g. warning of the source or stopping the provision of further receiver device keys to this source, respectively receiver device.

The improved cryptographic concept is, for example, based on asymmetric bilinear pairings, e.g. of Type III or higher. This, for example, allows a predefined security level to be defined by choosing specific elliptic curves such as one of several Barreto-Naehrig curves or Barreto-Lynn-Scott curves, e.g. parameterized to provide at least a predefined number of bits of security strength, like 80 bits, 100 bits or even higher, adjustable to e.g. available computing resources.

Accordingly, an implementation of a method according to the improved cryptographic concept for transmitting payload data via a one-to-many communication channel from a provider device to at least one receiver device comprises generating a public key set supporting asymmetric bilinear pairings, e.g. for a predefined security level, based on a first generator selected from a first cyclic group, on a second generator selected from a second cyclic group different to the first cyclic group, on a first random number and on a second random number. A number of elements of the public key set depends on a predefined number of consumers. The method further comprises generating a number of receiver device keys based on the public key set, on the second random number and on the predefined number of consumers. A size of each of the receiver device keys is independent of the number of consumers. For example, each receiver device key has a fixed size that is dependent mainly on the predefined security level, in particular on the size of an element in the second cyclic group. For example, the size of each receiver device key corresponds to two elements in the second cyclic group.

It is not necessary to generate the receiver device keys for all possible consumers, e.g. for having a reserve. Hence, the number of generated receiver device keys is equal or smaller than the predefined number of consumers. The receiver device keys are distributed, e.g. via a secure communication channel, e.g. one-to-one, to respective devices, including the at least one receiver device. Generation of the public key set and the receiver device keys is, for example, performed on a trusted entity. For example, the trusted entity can ensure that the public key set, the random numbers used, and the receiver device keys are protected from unauthorized access.

The method further comprises generating a provider key based on the public key set, on an encryption random number, on the first random number and on the predefined number of consumers and storing the provider key in the provider device. Generating the provider key may be performed in the trusted entity or as an alternative, in the provider device. Furthermore, an envelope is generated based on the public key set, on the encryption random number and on the predefined number of consumers and for example stored in the provider device until it is distributed. The envelope is distributed by the provider device via the one-to-many communication channel to the respective devices including the at least one receiver device. Also, generation of the envelope may be performed on a trusted entity or on the provider device, in particular together with the provider key. If the provider key and the envelope are generated by a trusted entity, the trusted entity, for example, can send them to the provider device via a secure communication channel. For example, a size of the envelope is fixed and particularly is also independent of the number of consumers.

The at least one receiver device generates a receiver key, which corresponds to the provider key, based on the distributed envelope and the receiver device key distributed to the at least one receiver device. Hence, a corresponding key pair is available on the trusted entity or on the provider device and, completely or only part of it, on the receiver device. The provider device then encrypts and/or signs the payload data employing the provider key for producing protected payload data, which are distributed by the provider device via the one-to-many communication channel, to the respective devices including the at least one receiver device. The at least one receiver device processes, e.g. decrypts and/or authenticates, the protected payload data employing the receiver key.

For example, a basis for generating the receiver key by the at least one receiver device includes the distributed envelope and the receiver device key, as described above, and is free from further elements of the public key set. Hence, on each of the receiver devices, the distributed envelope and the respective receiver device key is sufficient for generating the respective receiver key. In particular no further information from the trusted entity or the provider device is needed for the receiver key generation, i.e. neither information about any of the random numbers nor the number of consumers or receiver device keys of any other receiver devices need to be known in the at least one receiver device.

For example, an order of the first cyclic group and the second cyclic group is a selected prime number, and the first random number, the second random number and the encryption random number are positive integer numbers smaller than the selected prime number. For example, if r is the selected prime number, the random numbers are in the range between 1 and r−1.

In various embodiments, generating the public key set further includes generating a first constant number based on the first generator, the second generator, the first random number and the predefined number of consumers. Similarly, a second constant number is generated based on the first generator, the first random number, the second random number and the predefined number of consumers. If the first constant number and the second constant number are included in the public key set, this can simplify the generation of the provider key and the envelope.

For example, a basis for generating the provider key includes the first constant number and the encryption random number and is free from further elements of the public key set. Similarly, a basis for generating the envelope includes the first generator, the second constant number and the encryption random number and is free from further elements of the public key set. Hence, once the receiver device keys and the first and the second constant number are generated, all other elements of the public key set except the first generator are not necessary any more for generating the provider key and the envelope, which is the basis for generating the receiver keys together with the receiver device keys. Hence, when performing the method less memory is needed in the respective systems.

In various embodiments generating the public key set and the receiver device keys is performed by a trusted entity. The receiver device keys are distributed from the trusted entity to the respective devices, in particular including the at least one receiver device. Also, the provider key and the envelope may be generated by the trusted entity. However, it is still possible, e.g. by providing parts of the public key set to the provider device, that provider key and envelope are generated by the provider device. In some implementations trusted entity and provider device may be the same device or logical entities of several applications on a single device. In some implementations all operations may be performed on a single device, which is both the trusted entity and the provider device. For example, the provider device also performs the generation of the various keys and envelopes, including their distribution.

In various embodiments the public key set and the receiver device keys are generated repeatedly with a first repetition rate, wherein each generated public key set distinguishes from the public key set of a preceding repetition. For example, this can be achieved by choosing different first and second random numbers. The provider key and the envelope are generated with a second repetition rate that is higher than the first repetition rate, e.g. by a factor of at least 100. Also, here the provider key and the envelope should change with every repetition. To this end, the encryption random number for each generated provider key and each generated envelope distinguishes from the encryption random number of a preceding repetition. For example, the first repetition rate is 30 days as a non-limiting example, while the second repetition rate is between 30 seconds and 14,400 seconds, respectively four hours, such that a factor between first and second repetition rate is between 180 and 86,400.

In various embodiments generating the provider key and the receiver key includes employing a Hash-Key Derivation Function, HKDF, that for example may be applied to the results of the asymmetric bilinear pairing operations (so the provider key and the corresponding receiver key) to apply standard cryptographic functions. For example, such HKDF results in a symmetric AES key.

The improved cryptographic concept further provides a provider device for a one-to-many communication network wherein a public key set supporting asymmetric bilinear pairings, e.g. for a predefined security level, is generated by the provider device or a trusted entity based on a first generator selected from a first cyclic group, on a second generator selected from a second cyclic group different to the first group, on a first random number and on a second random number, wherein a number of elements of the public key set depends on a predefined number of consumers. Furthermore, a number of receiver device keys are generated by the provider device, or the trusted entity based on the public key set, on the second random number and on the predefined number of consumers, wherein the number of receiver device keys is equal or smaller than the predefined number of consumers, and the receiver device keys are distributed to respective devices of a plurality of devices, including at least one receiver device.

With these prerequisites, the provider device is configured to communicate with the plurality of devices including at least one receiver device via a one-to-many communication channel, which may be a broadcast or multicast communication channel. The provider device is further configured to store a provider key that is generated by the provider device or the trusted entity based on the public key set, on an encryption random number, on the first random number and on the predefined number of consumers. The provider device further stores an envelope that is generated by the provider device or the trusted entity based on the public key set, on the encryption random number and on the predefined number of consumers. The provider device is further configured to distribute, via the one-to-many communication channel, the envelope to the respective devices including at least one receiver device, to encrypt and/or sign payload data employing the provider key for producing protected payload data and to distribute, via the one-to-many communication channel, the protected payload data to the respective devices including the at least one receiver device.

The improved cryptographic concept further provides a receiver device for a one-to-many communication network wherein the public key set and the number of receiver device keys are generated as described above. The receiver device is configured to receive a respective device key from the number of device keys, e.g. via a secure communication channel. The receiver device is further configured to receive communications from a provider device via a one-to-many communication channel, e.g. including a broadcast or multicast communication channel. The receiver device further receives, via the one-to-many communication channel, an envelope and generates a receiver key based on the received device key and the received envelope, wherein the receiver key corresponds to a provider key of the provider device. The receiver device is further configured to receive, via the one-to-many communication channel, protected payload data which are encrypted and/or signed by the provider device employing the provider key, and to process, e.g. decrypt and/or authenticate the protected payload data employing the receiver key.

According to the improved cryptographic concept, a communication system for a one-to-many communication network may comprise a provider device as described above and a receiver device as described above.

The improved cryptographic concept further provides a trusted entity for a communication system with a one-to-many communication network wherein the trusted entity is configured to generate a public key set and a number of receiver device keys as described above. The trusted entity is further configured to distribute, via a secure communication channel, e.g. a one-to-one secure communication channel, the receiver device keys to respective receiver devices. The trusted entity is further configured to generate a provider key based on a public key set, on an encryption random number, on the first random number and on the predefined number of consumers. Furthermore, the trusted entity is configured to generate an envelope based on the public key set, on the encryption random number and on the predefined number of consumers, wherein each of the receiver device keys together with the envelope enable the respective receiver devices to generate a respective receiver key, which corresponds to the provider key. The trusted entity is further configured to provide the provider key to the provider device and provide the envelope to the respective receiver devices or to the provider device, e.g. for distributing them to the receiver devices.

Further implementations and developments of the provider device, the receiver device, the trusted entity and the communication system become readily apparent for the skilled reader from the various implementations described above or in the following in conjunction with the method for transmitting payload data via a one-to-many communication channel. For example, the improved cryptographic concept may be applied in a positioning system like a GNSS positioning system, where the payload data e.g. are correction data of a GNSS augmentation service like PointPerfect provided by u-blox. In another example, the improved cryptographic concept may be applied in a system distributing any kind of high value data with short time validity to a large number of consumers.

The method according to one of the implementations described may be provided as a computer program product that can be stored on a non-volatile storage medium. The computer program product comprising instructions which, when executed on two or more processors of at least a provider device and a receiver device, can cause the two or more processors to perform the method according to any of the various implementations described above.

BRIEF DESCRIPTION OF DRAWINGS

The improved cryptographic concept will be explained in more detail in the following with the aid of the drawings. Elements and functional blocks having the same or similar function bear the same reference numerals throughout the drawings. Hence their description is not necessarily repeated in following drawings.

In the drawings.

DETAILED DESCRIPTION

Figure 1:
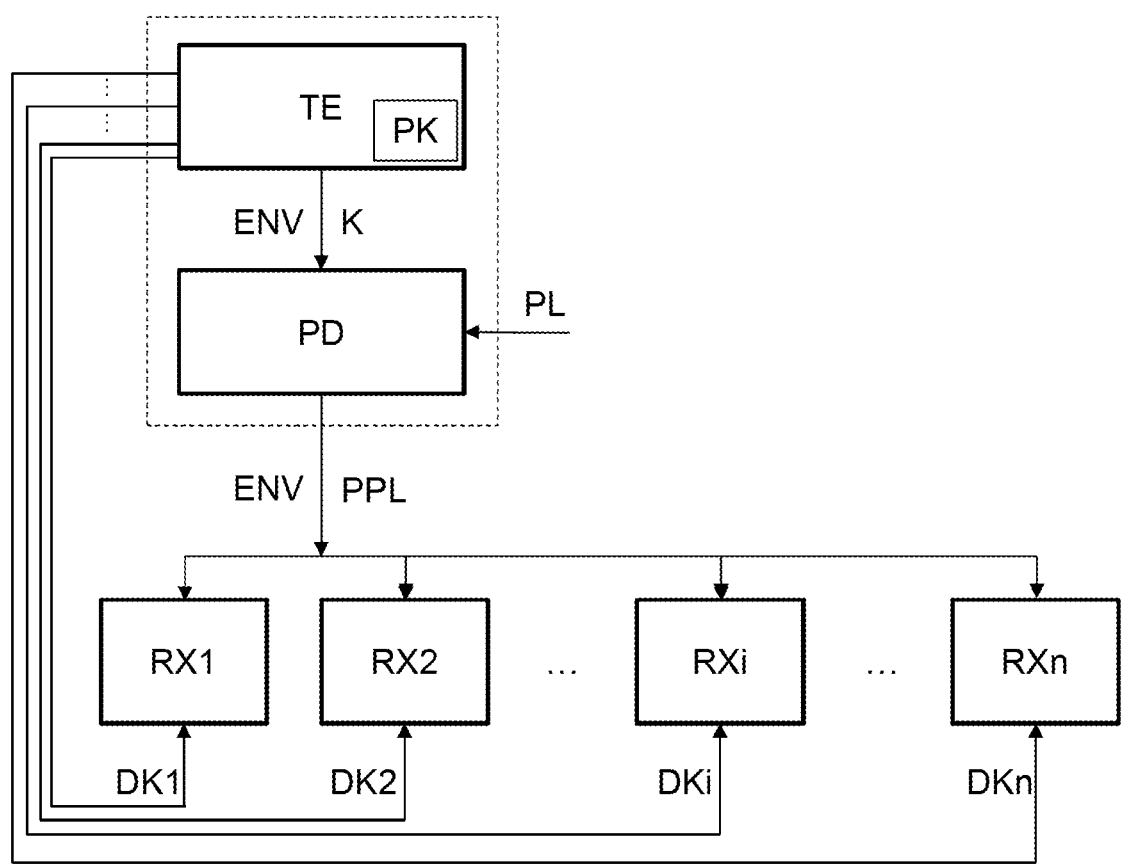
FIG. 1 shows an example implementation of a one-to-many communication network.

FIG. 1 shows an example implementation of a one-to-many communication network, e.g. implemented as a broadcast communication network or multicast communication network using IP or non-IP protocols. A primary purpose of such a network is to transmit protected payload data PPL over a one-to-many communication channel from a server side to a client side. In this example implementation, the server side comprises a trusted entity TE and a provider device PD that may or may not be implemented together in a single device or server instance. On the client side there are several receiver devices RX1, RX2, RXi, RXn, such that, for example, n different devices are recipients of data sent via the one-to-many communication channel. In order to allow secure communication of the payload data PL, a provider key K may be employed to generate protected payload data PPL transmitted via the one-to-many communication channel. Details of the improved cryptographic concept employed in the one-to-many communication network will be explained in the following in conjunction with FIG. 2.

Figure 2:
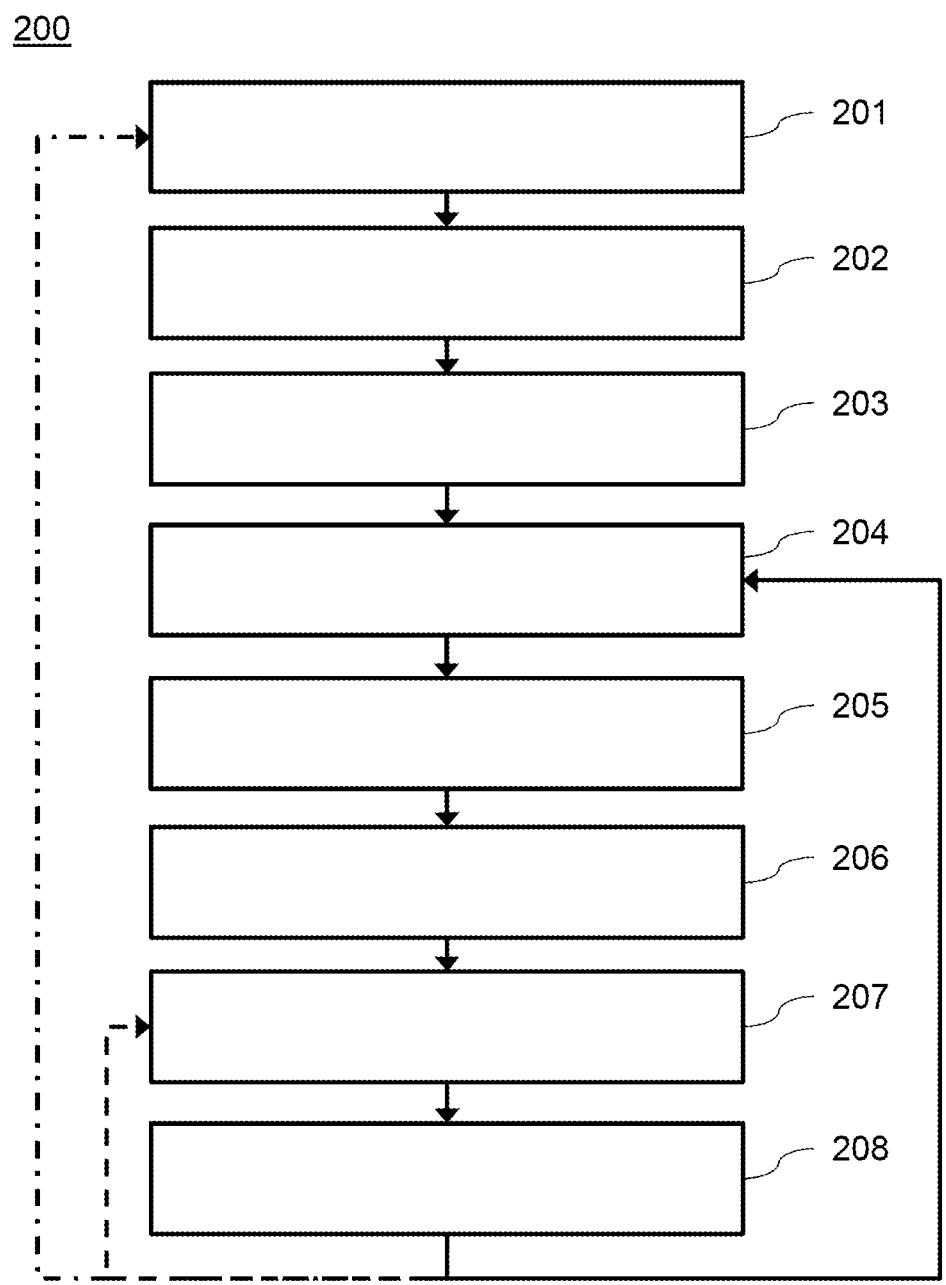
FIG. 2 shows an example implementation of a method for protecting payload data.

FIG. 2 shows an example implementation of a method 200 for transmitting protected payload data via a one-to-many communication channel from the provider device PD to one or more receiver devices, as shown in FIG. 1. In step 201 a public key set PK is generated supporting asymmetric bilinear pairings, e.g. of Type III or higher, e.g. for a predefined security level. The generation of the public key set PK is based on a first generator P1 selected from a first cyclic group G1, on a second generator P2 selected from a second cyclic group G2 different to the first cyclic group G1, on a first random number $\alpha$ and on a second random number Y. A number of elements of the public key set PK depends on a predefined number n of consumers, e.g. the n receiver devices RX1, RX2, RXi to RXn shown in FIG. 1.

In step 202 the trusted entity TE generates a number of receiver device keys DK1, DK2, DKi to DKn based on the public key set PK, on the second random number Y and on the predefined number n of consumers. The number of receiver device keys DKi is equal to the predefined number n of consumers. However, if less consumers, respectively receiver devices, have to be provided with respective device keys DKi, the number of receiver device keys DKi that is generated and/or distributed to the respective receiver devices can be smaller than the predefined number n of consumers.

The distribution of the receiver device keys DK1, DK2, DKi to DKn to the respective receiver devices is performed in step 203 employing respective secure communication channels between the trusted entity TE and the receiver devices RX1, RX2, RXi to RXn. An example of the distribution can be seen in FIG. 1. For example, the trusted entity TE distributes all the different receiver device keys DKi using for example a standard TLS/DTLS/OSCORE or QUIC secure transport protocol. For example, the receiver device keys can have a size of less than 2000 bits each, depending on the predefined security level chosen for the implementation of the asymmetric bilinear pairings. Each consumer, respectively receiver device, now has a different receiver device key, so that if the key is compromised or disclosed by a consumer without permission, the source of the disclosure can be easily identified.

Referring back to FIG. 2, in step 204 the provider key K is generated based on the public key set PK, on an encryption random number t, on the first random number a and on the predefined number n of consumers. The provider key K is then handed over and/or stored in the provider device PD. Furthermore, in step 204, an envelope ENV is generated based on the public key set, on the encryption random number t and on the predefined number n of consumers. The envelope ENV may also be handed over and/or stored in the provider device PD.

Furthermore, in step 205 the provider device PD distributes the envelope ENV via the one-to-many communication channel to the respective receiver devices RX1, RX2, RXi to RXn, as shown in the block diagram of FIG. 1.

The common envelope ENV that is distributed to all receiver devices allows the generation of a receiver key in each of the receiver devices employing the individual receiver device keys DK1, DK2, DKi to DKn. The generation of the receiver keys in the receiver devices is performed in step 206. The receiver keys generated in this way correspond to the provider key K such that both the provider device PD as a sender and all of the receiver devices RX1, RX2, RXi to RXn are in possession of matching keys usable for encryption and/or authentication.

Hence, in step 207 the provider device PD encrypts and/or signs the payload data PL employing the provider key K for producing protected payload data PPL, which will be distributed via the one-to-many communication channel to the respective receiver devices, as shown in FIG. 1. Anyway, it is possible that step 207 is performed at a different point in time, e.g., before step 206.

Accordingly, in step 208 each of the receiver devices can process, e.g. decrypt and/or authenticate, depending on the operation of the provider device, the protected payload data PPL employing the respective receiver key generated on that device.

Protection by the provider device PD with the provider key K, distribution to the receiver devices and processing on the receiver devices can be performed iteratively by going back to step 207. This may be useful if new payload data PL are available for transmitting to the receiver devices. The respective step back to step 207 is indicated by a dashed arrow.

It should be noted that the envelope ENV and the protected payload data PPL can be sent via standard unsecure IP or non-IP protocols (such as proprietary non-terrestrial communication protocols or standard 3GPP control plane or signalling communication protocols). The envelope ENV may have a size of less 1000 bits, depending on the predefined security level.

If, by assumption one of the receiver device keys DKi is disclosed to a non-authorized consumer, this non-authorized consumer would be able to process protected payload data PPL as soon as the envelope ENV is distributed and enables the consumer to generate a matching receiver key to the provider key K. This is irrespective of whether the source of the receiver device key provided to the non-authorized consumer can be identified. Anyway, as the receiver device key DKi is unique per receiver device, the source of the leakage can be identified. Furthermore, when the receiver device keys DKi are changed with the first repetition rate, the identified source of the leakage can be excluded from the new receiver device keys DKi distribution.

If, by assumption a receiver key (corresponding to the provider key K) is disclosed to a non-authorized consumer, this non-authorized consumer would be able to process protected payload data PPL. However, the improved cryptographic concept allows the provider key K and the envelope ENV to be changed with little effort and very often with the second repetition rate (for example every 30 seconds), including distribution of the new envelope. Hence, the lifetime of the disclosed receiver key can be very limited, in particular without changing the public key set PK and the receiver device keys DK1, DK2, DKi to DKn.

For example, after one or more iterations (steps 207, 208) of transmitting protected payload data, the method can jump back to step 204 and the subsequent steps for generating a new provider key K and an associated envelope ENV using a different encryption random number.

In a similar fashion, the method 200 can be completely started over by returning back to step 201, indicated by the dashed-dotted line in FIG. 2. Accordingly, the process of generating a new public key set PK and the corresponding subsequent steps can be initiated again.

For example, the public key set PK and the receiver device keys DKi are generated repeatedly with a first repetition rate, wherein each generated public key set PK distinguishes from the public key set PK of a preceding repetition. This can, for example, be accomplished by choosing different generators P1, P2 and/or different random numbers a, Y. The provider key K and the envelope ENV are generated with a second repetition rate that is higher than the first repetition rate, for example by a factor of at least 100. Similarly, the encryption random number t for each generated provider key K and each generated envelope ENV distinguishes from the encryption random number t of a preceding repetition to ensure distinguishing provider keys and envelopes.

For example, the first repetition rate for generating the public key set PK and the receiver device keys DKi is 30 days, while the second repetition rate for generating the provider key and the envelope is between 30 seconds and 14,400 seconds, respectively four hours as non-limiting examples. These numbers may result in a ratio between first and second repetition rate between 180 and 86,400.

For example, the predefined security level for the asymmetric bilinear pairings is based on elliptic curves. For example, Barreto-Naehrig curves or Barreto-Lynn-Scott curves could be used, parameterized to provide at least a given number of bits of security strength, like 80 bits or more.

It should be pointed out that for the generation of the receiver keys in the receiver devices, knowledge of the distributed envelope ENV and the respective receiver device key DKi is sufficient and particularly no further elements of the public key set are needed for this purpose. Hence, generation and updating of the receiver keys is enabled by the efficient distribution of the respective envelope generated in conjunction with a provider key, once the receiver device keys are stored in the receiver devices. This is, for example, useful if the one-to-many communication channels are unidirectional satellite channels with a low data rate in the range of a few kilobits per second. Hence, only having to provide envelopes with a limited number of bits over the communication channel preserves resources. For example, the improved cryptographic concept may be applied in a positioning system like a GNSS positioning system, where the payload data e.g. are correction data of a GNSS augmentation service like PointPerfect provided by u-blox.

In an example implementation an order of the first cyclic group G1 and the second cyclic group G2 is a selected prime number r and the first and the second random number α, Y and the encryption random number t are positive integer numbers smaller than the selected prime number r.

For example, generating the public key set (PK) further includes generating a first constant number $\overline{K}$ and a second constant number $\overline{C}_1$. The first constant number $\overline{K}$ is based on the first generator P1, the second generator P2, the first random number α and the predefined number n of consumers. The second constant number $\overline{C}_1$ is based on the public key set PK and the predefined number n of consumers.

$\overline{KK}=e(P1,P2)^{\alpha^{n+1}}$; For example, the first constant number is generated according to $\overline{K}$ $\overline{C}_1\overline{C}_1=([\gamma]P1+\Sigma_{j=1}^{n}x_{n+1-j})$; and the second constant number is generated according to $\overline{C}_1$ with $x_j$ being $[\alpha^j]P1$, $[Y]P1$ being the group theory additive notation for $Y^{th}$ power of P1 and e(..., ...) being a bilinear pairing operator, which as such is known to the skilled reader.

This allows, for example, using the encryption random number t the provider key K to be generated according to $K=\overline{K}^t=e(P1,P2)^{t\alpha^{n+1}}$; and ENV={[t]P1,[t]$\overline{C}_1$}. the envelope ENV to be generated according to $e(C_1,y_i)/e(C_0,PK_i)$; Accordingly, the receiver key may be generated according to
with ENV={$C_0,C_1$}={[t]P1,[t]$\overline{C}_1$} and $y_i$, $PK_i$ being part of the receiver device key $DK_i$.

Figure 3:
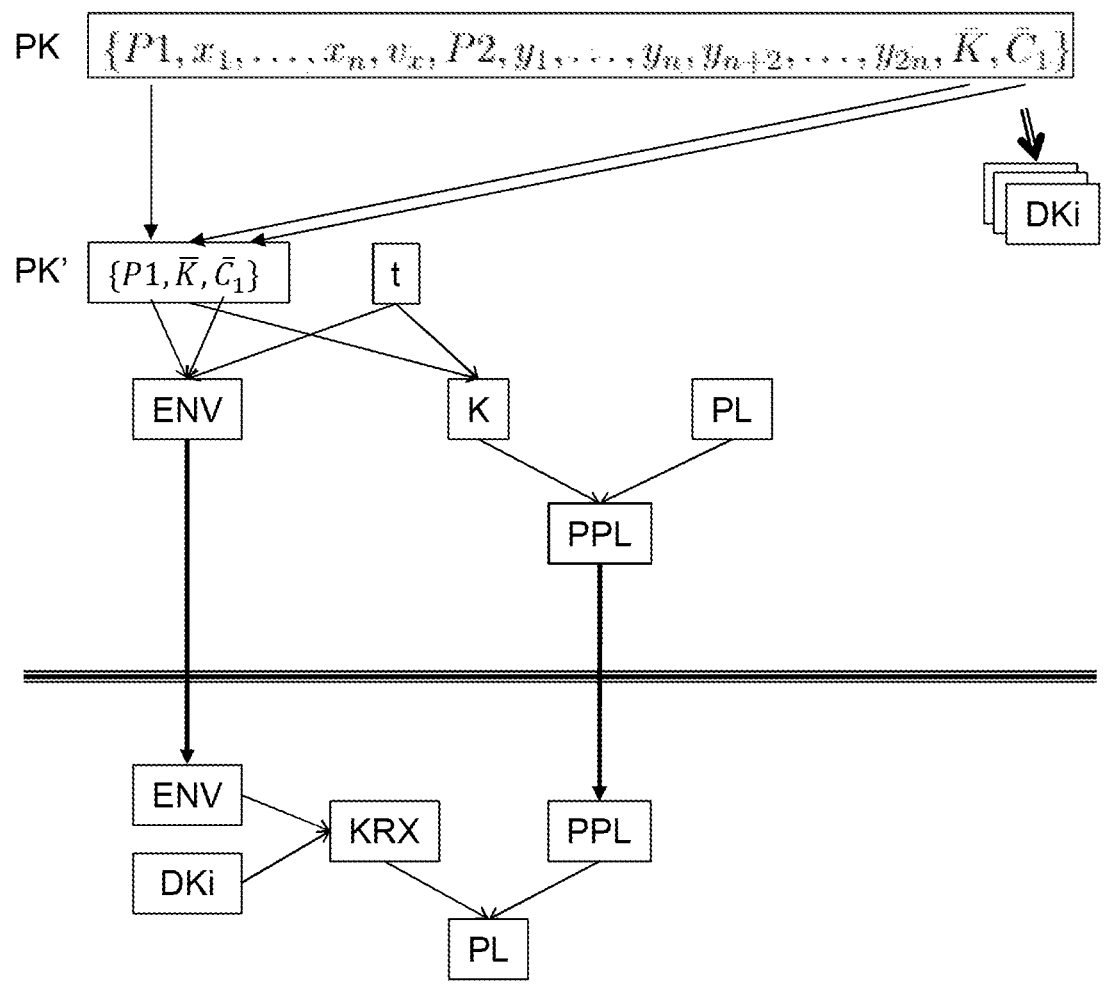
FIG. 3 shows example details of a method for protecting payload data.

For example, referring now to FIG. 3, under the assumption of Type III asymmetric bilinear pairings, the public key set PK may be generated according to $PK=\{P1,x_1,\ldots,x_n,v_x,P2,\mathcal{Y}_1,\ldots,\mathcal{Y}_n,\mathcal{Y}_{n+2},\ldots,\mathcal{Y}_{2n},\overline{K},\overline{C}_1\}$, where $P1\in\mathbb{G}_1$; $P2\in\mathbb{Z}_{r,2}^*$; $\alpha,\gamma\in\mathbb{G}$ $x_i=[\alpha^i]P1$, $\mathcal{Y}_i=[\alpha^i]P2, v_x=[\gamma]P1$, $\overline{K}=e(P1,P2)^{\alpha^{n+1}}\in\mathbb{G}_T$, $\overline{C}_1=(v_x\Sigma_{j=1}^{n}x_{n+1-j})\in\mathbb{G}_1$, with P1 being the first generator, P2 being the second generator, n being the predefined number of consumers, $\mathbb{G}_1$ being the first cyclic group, $\mathbb{G}_2$ being the second cyclic group, $G_T$ being the target cyclic group of the bilinear pairing operation, α being the first random number, γ being the second random number, e(..., ...) being a bilinear pairing operator, and i being a positive integer number. As discussed before α and γ are positive integer numbers smaller than the prime order r. The size of PK depends on the predefined number n of consumers, e.g. according to:

$(n+3)|\mathbb{G}_1|+2n|\mathbb{G}_2|+|\mathbb{G}_T|$

Accordingly, the receiver device keys $DK_i$ for each receiver device with index i are generated according to:

$DK_i=\{y_i,PK_i=[\gamma]y_i+\Sigma_{j=1,j\neq i}^{n}y_{n+1-j+i}\}\in\mathbb{G}_2^2$ with the definition of $y_i$ as given above.

Using Type III asymmetric bilinear pairings results in the bilinear pairing operator $e:\mathbb{G}_1\times\mathbb{G}_2\to\mathbb{G}_T$. In asymmetric pairings, the two groups $\mathbb{G}_1$, $\mathbb{G}_2$ are not equal: one of them is smaller than the other. Let $\mathbb{G}_1$ be the smaller group, therefore leading to smaller group elements.

The scheme proposed in this disclosure requires the computation of a public key PK and as many receiver device keys DKi as many consumers are expected to take part to the system for the given time period, e.g. month. Given the optimization provided in this section, after the generation of all the receiver device keys DKi, the trusted entity needs to store only a subset PK' {P1,$\overline{K}$,$\overline{C}_1$} of the public key PK and may delete the rest of the public key PK. This can be seen in FIG. 3.

As can be further seen from FIG. 3, for generating the envelope ENV and the provider key K, only the public key subset PK' and the encryption random number t are needed. The respective dependencies can be seen from the arrows between the respective blocks. As discussed before, the envelope ENV is transmitted, respectively distributed, from the server side to the client side, i.e. the receiver devices.

Furthermore, having payload to be transmitted, the provider device can protect the payload data PL with the provider key K to generate the protected payload data PPL, which then is distributed to the client side for further processing. Each receiver device can generate the receiver key KRX from the distributed envelope and its receiver device key DKi. This receiver key KRX can be employed to process the protected payload data PPL, e.g. to decrypt the protected payload PPL for regenerating the payload data PL or to authenticate it.

Please note that, based on the hardness of the Elliptic Curve Discrete Logarithm Problem (ECDLP), the quantities {P1,$\overline{K}$,$\overline{C}_1$} are to be considered public (no secret can be derived from them). However, if an attacker should gain access to {P1,$\overline{K}$,$\overline{C}_1$}, he will be able to correctly generate ciphertexts with false data. Moreover, the scheme proposed in this section does not allow to dynamically change (increase/decrease) the number of users within a month. Therefore, to account for new joining users, one should create more receiver device keys DKi than needed at the beginning of the time period, e.g. month.

There are three possible cases concerning the management of the receiver device keys DKi: either one cancels them after distributing them, or one keeps all the receiver device keys DKi safely stored in a hardware security module (HSM) server side or one stores only $\alpha$, $\gamma$, n and P2 to be able to recreate the keys if needed.

In case one decides to store the receiver device keys DKi on the server side, one should account for 2 elements in G2 for each consumer in HSM. Depending on the chosen curve, a rough, lower-bound estimation could be to store from 600 to 1500 bits per consumer in HSM. This solution requires no computations to get the receiver device keys DKi for any device but requires to store many data in HSM (linearly dependent by the number of devices).

In case one decides to store in HSM only $\alpha$, $\gamma$, n and P2, it is possible to create the receiver device keys DKi on demand. This solution requires to store only two elements in Zr ($\alpha$, $\gamma$) in HSM and the quantity of data to store is not dependent by the number of devices. The main drawback of this approach is that two-thirds of the PK (P2-related, $y_i$ components) should be re-computed every time to be able to calculate the receiver device key DKi of one consumer.

For some implementations the Barreto-Naehrig curve BN_P158 can be used, which is a relatively small curve that provides around 80 bits of equivalent security. With the adoption of the asymmetric pairings, using the curve BN_P158, we have the following sizes: An element in $\mathbb{G}_1$ is on 159 bits; an element in $\mathbb{G}_2$ is on 316 bits; an element in $\mathbb{G}_T$ is on 1896 bits; an element in $\mathbb{Z}_r$ is on 158 bits. However, in the adaptation proposed in this disclosure, the devices do not have to store the public key, cutting off a huge portion of flash memory. A receiver device key $DK_i$ is composed of two elements in $\mathbb{G}_2$, so it is on 632 bits. A digital envelope Env is composed of only two elements in $\mathbb{G}_1$, so it is on 318 bits.

For some alternative implementations the Barreto-Naehrig curve BN_P254 can be used, which is a relatively small curve that provides around 100 bits of equivalent security. With the adoption of the asymmetric pairings, using the curve BN_P254, we have the following sizes: An element in $\mathbb{G}_1$ is on 255 bits; an element in $\mathbb{G}_2$ is on 509 bits; an element in $\mathbb{G}_T$ is on 3048 bits; an element in $\mathbb{Z}_r$ is on 254 bits. However, also in this adaptation, the devices do not have to store the public key, cutting off a huge portion of flash memory. A receiver device key $DK_i$ is composed of two elements in $\mathbb{G}_2$, so it is on 1018 bits. A digital envelope Env is composed of only two elements in $\mathbb{G}_1$, so it is on 510 bits.

Both curves BN_P158 and BN_P254 provide fairly small elements in G1, and therefore fairly small bandwidth overhead, which particularly is useful over satellite communication.

For further alternative implementations the Barreto-Lynn-Scott curve BLS12_381 curve can be used, which is a curve that is recognized and used as a standard by the Centre for Research on Cryptography and Security. It targets 128 bits of equivalent security (between 118 bits and 120 bits, to be precise) and it is widely used. The increase in security level, however, is very costly for the device's RAM. With the adoption of the asymmetric pairings, using the curve BLS12_381, we have the following sizes. An element in $\mathbb{G}_1$ is on 384 bits (~48 bytes); an element in $\mathbb{G}_2$ is on 768 bits (~96 bytes); an element in $\mathbb{G}_T$ is on 4608 bits (~576 bytes); an element in $\mathbb{Z}_r$ is on 255 bits (~32 bytes). A receiver device key $DK_i$ is composed of two elements in $\mathbb{G}_2$, so it is on 1536 bits (~192 bytes). A digital envelope Env is composed of only two elements in $\mathbb{G}_1$, so it is on 768 bits (~96 bytes).

We now show how to derive a symmetric key for AES encryption and decryption. We recall that K is the secret that the trusted entity or the provider device randomly generates for each envelope ENV, and K is also the secret that a device extracts from the received envelope ENV using their receiver device key $DK_i$. Since K is an element in $\mathbb{G}_T$, it is not possible to use K directly as an AES symmetric key.

Moreover, it is not secure to simply truncate K and use for example only the first 128 bits. The fastest and simple solution is to feed K to a Hash-Key Derivation Function (HKDF) and to use the result as the AES key. It has been found reasonable to use a function of the SHA-2 family, feeding the $\mathbb{G}_T$ element K, plus some context information (timestamp or strings) and then truncate the output to the required length (e.g., 128 bits) to determine the AES key.

$$AES_{Key}=HKDF(K,Time,ContextData)|_{128}$$

The improved cryptographic concept achieves the following effects:

The sizes of the envelope ENV and the receiver device keys $DK_i$ are not dependent on the number of recipients and small enough to be suitable for constrained communication channels. These sizes in fact depend only on the security level expected, for instance for 128-bits security it is less than 2000 bits.

The scalability to high number of devices is possible.

The proposed solution uses a novel broadcast encryption scheme based on asymmetric pairing-based cryptography, optimized for constrained device and constrained networks to generate short-lived keys from which AES symmetric keys can be derived, and the very efficient AES encryption/decryption scheme to protect the confidentiality and/or authenticity of payloads with short time validity.

The memory and computational resources required for the scheme are unbalanced, high on the server side and low on the device side. This allows its utilization for constrained devices and/or constrained communication channels.

A traitor disclosing, e.g. on the dark web, the short-lived key K will have to do that continuously as they can be constructed really short-term (for example every 30 seconds) and so it can be very difficult to use them, in particular considering the high latency of the onion routing (TOR protocol).

A traitor disclosing its receiver device key $DK_i$ can be immediately identified.

It should be apparent to the skilled reader that devices involved in operation of the improved cryptographic concept like trusted entity, provider device and receiver devices, each may be equipped with some kind of processor and associated memory, volatile and/or non-volatile, for storing instructions to carry out the respective method steps and for storing keys, envelope, payload data etc. as needed. The improved cryptographic concept particularly allows to keep the processor and memory requirements on the client side, i.e. the receiver devices as small as possible, while keeping the memory intensive operations to the server side.

Furthermore, it should be apparent to the skilled reader which steps in a method according to the improved cryptographic concept are to be performed by which entity such that at this portion of the disclosure it is referred to the summary of invention. Various embodiments of the improved cryptographic concept can be implemented in the form of logic in software or hardware or a combination of both. The logic may be stored in a computer readable or machine-readable storage medium as a set of instructions adapted to direct one or more processors of a (distributed) computer system to perform a set of steps disclosed in embodiments of the improved cryptographic concept. The logic may form part of a computer program product adapted to direct an information-processing device to automatically perform a set of steps disclosed in embodiments of the improved cryptographic concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

| | |
|---|---|
| TE | trusted entity |
| PD | provider device |
| RX1, RX2, RXi, RXn | receiver device |
| K | provider key |
| KRX | receiver key |
| ENV | envelope |
| DK1, DK2, DKi, DKn | receiver device key |
| PL | payload |
| PPL | protected payload |
| PK | public key set |
| t | encryption random number |
| 200 | method |
| 201-208 | method steps |

The invention claimed is:

1. A method for protecting payload data transmitted via a one-to-many communication channel from a provider device to at least one receiver device, the method comprising:

generating a public key set (PK) supporting asymmetric bilinear pairings for a predefined security level based on a first generator (P1) selected from a first cyclic group (G1), on a second generator (P2) selected from a second cyclic group (G2) different to the first cyclic group (G1), on a first random number ($\alpha$) and on a second random number (Y), wherein a number of elements of the public key set (PK) depends on a predefined number (n) of consumers;

generating a number of receiver device keys (DKi) based on the public key set (PK), on the second random number (Y) and on the predefined number (n) of consumers, wherein the number (i) of receiver device keys (DKi) is equal to or smaller than the predefined number (n) of consumers and wherein a size of each receiver device key of the receiver device keys (DKi) is independent of the number (n) of consumers;

distributing, via a secure communication channel, the receiver device keys (DKi) to respective devices including the at least one receiver device;

generating a provider key (K) based on the public key set (PK), on an encryption random number (t), on the first random number ($\alpha$) and on the predefined number (n) of consumers and storing the provider key (K) in the provider device;

generating an envelope (ENV) based on the public key set (PK), on the encryption random number (t) and on the predefined number (n) of consumers and storing the envelope (ENV) in the provider device and distributing, by the provider device via the one-to-many communication channel, the envelope (ENV) to the respective devices including the at least one receiver device;

generating, by the at least one receiver device, a respective receiver key, which corresponds to the provider key (K), based on the distributed envelope (ENV) and the receiver device keys received by the at least one receiver device, respectively;

performing at least one of encrypting or signing, by the provider device, the payload data employing the provider key (K) for producing protected payload data;

distributing, by the provider device via the one-to-many communication channel, the protected payload data to the respective devices including the at least one receiver device; and processing, by the least one receiver device, the protected payload data employing the respective receiver key, wherein the processing includes at least one of decrypting or authenticating.

2. The method according to claim 1, wherein a basis for generating the respective receiver key by the at least one receiver device is free from further elements of the public key set (PK).

3. The method according to claim 1, wherein an order of the first cyclic group (G1) and the second cyclic group (G2) is a selected prime number (r) and wherein the first random number ($\alpha$), the second random number (Y) and the encryption random number (t) are positive integer numbers smaller than the selected prime number (r).

4. The method according to claim 1, wherein generating the public key set (PK) further includes:

generating a first constant number ($\overline{K}$) based on the first generator (P1), the second generator (P2), the first random number ($\alpha$) and the predefined number (n) of consumers; and generating a second constant number ($\overline{C}_1$) based on the first generator (P1), the first random number ($\alpha$), the second random number (Y) and the predefined number (n) of consumers.

5. The method according to claim 4, wherein a basis for generating the provider key (K) includes the first constant number ($\overline{K}$) and the encryption random number (t); and a basis for generating the envelope (ENV) includes the first generator (P1), the second constant number ($\overline{C}_1$), the encryption random number (t) and is free from further elements of the public key set (PK).

6. The method according to claim 4, wherein
the first constant number $\overline{K}$ is generated according to $$\overline{K} = e(P1, P2)^{\alpha^{n+1}};$$

the second constant number $\overline{C}_1$ is generated according to $$\overline{C}_1 = ([\gamma]P1 + \Sigma_{j=1}^{n} x_{n+1-j});$$

with P1 being the first generator, P2 being the second generator, $\alpha$ being the first random number, $\gamma$ being the second random number, n being the predefined number of consumers, $x_j$ being $[\alpha^j]P1$, $[Y]P1$ being the group theory additive notation for $Y^{th}$ power of P1 and e( . . . , . . . ) being a bilinear pairing operator and wherein the provider key K is generated according to $$K = \overline{K}^t = e(P1, P2)^{t\alpha^{n+1}}; \text{ and}$$

the envelope ENV is generated according to $$ENV = \{[t]P1, [t]\overline{C}_1\};$$

with t being the encryption random number.

7. The method according to claim 1, wherein the public key set PK is generated according to $$PK = \{P1, x_1, \ldots, x_n, v_x, P2, y_1, \ldots, y_n, y_{n+2}, \ldots, y_{2n}, \overline{K}, \overline{C}_1\},$$

where $$P1 \in \mathbb{G}_1; P2 \in \mathbb{G}_2; \alpha, \gamma \in \mathbb{Z}_r^+$$

$$x_i = [\alpha^i]P1, y_i = [\alpha^i]P2, v_x = [\gamma]P1,$$

$$\overline{K} = e(P1, P2)^{\alpha^{n+1}}$$

$$\overline{C}_1 = (v_x \Sigma_{j=1}^n x_{n+1-j}),$$

with P1 being the first generator, P2 being the second generator, n being the predefined number of consumers, $\mathbb{G}_1$ being the first cyclic group, $\mathbb{G}_2$ being the second cyclic group, a being the first random number, γ being the second random number, e(..., ...) being a bilinear pairing operator, and i being a positive integer number smaller than or equal to the predefined number of consumers (n).

8. The method according to claim 7, wherein each of the receiver device keys $DK_i$ is generated according to:

$$DK_i = \{y_i, PK_i = [\gamma]y_i + \Sigma_{j=1, j \neq i}^n y_{n+1-j+i}\}.$$

9. The method according to claim 8, wherein the receiver key is generated according to $$e(C_1, y_i)/e(C_0, PK_i);$$

with $ENV = \{C_0, C_1\} = \{[t]P1, [t]\overline{C}_1\}$.

10. The method according to claim 1, wherein
generating the public key set (PK) and the receiver device keys (DKi) is performed by a trusted entity;
the receiver device keys (DKi) are distributed from the trusted entity to the respective devices;
the provider key (K) is generated by the trusted entity; and
the envelope (ENV) is generated by the trusted entity.

11. The method according to claim 1, wherein
the public key set (PK) and the receiver device keys (DKi) are generated repeatedly with a first repetition rate, each generated public key set (PK) distinguishing from the public key set (PK) of a preceding repetition;
the provider key (K) and the envelope (ENV) are generated with a second repetition rate that is higher than the first repetition rate; and
the encryption random number (t) for each generated provider key (K) and each generated envelope (ENV) distinguishes from the encryption random number (t) of a preceding repetition.

12. The method according to claim 1, wherein generating the provider key (K) and the receiver key includes employing a Hash-Key Derivation Function for achieving a symmetric AES key.

13. One or more tangible, non-transitory, computer-readable media storing instructions that, when executed by at least one processor, cause the at least one processor to perform operations comprising:
generating a public key set (PK) supporting asymmetric bilinear pairings based on a first generator (P1) selected from a first cyclic group (G1), on a second generator (P2) selected from a second cyclic group (G2) different to the first cyclic group (G1), on a first random number (α) and on a second random number (Y), wherein a number of elements of the public key set (PK) depends on a predefined number (n) of consumers;
generating a number of receiver device keys (DKi) based on the public key set (PK), on the second random number (Y) and on the predefined number (n) of consumers, wherein the number of receiver device keys (DKi) is equal to or smaller than the predefined number (n) of consumers and wherein a size of each of the receiver device keys (DKi) is independent of the number (n) of consumers;
distributing, via a secure communication channel, the receiver device keys (DKi) to respective devices including a receiver device;
generating a provider key (K) based on the public key set (PK), on an encryption random number (t), on the first random number (α) and on the predefined number (n) of consumers and storing the provider key (K) in a provider device;
generating an envelope (ENV) based on the public key set (PK), on the encryption random number (t) and on the predefined number (n) of consumers and storing the envelope (ENV) in the provider device and distributing, via a one-to-many communication channel, the envelope (ENV) to the respective devices including the receiver device;
generating a receiver key, which corresponds to the provider key (K), based on the distributed envelope (ENV) and a first receiver device key distributed to the receiver device;
performing at least one of encrypting or signing payload data employing the provider key (K) for producing protected payload data;
distributing, via the one-to-many communication channel, the protected payload data to the respective devices including the receiver device; and
processing, the protected payload data employing the receiver key, wherein the processing includes at least one of decrypting or authenticating.

14. A provider device for a one-to-many communication network, wherein the provider device comprises
a processor,
memory and instructions stored on the memory,
wherein a public key set (PK) supporting asymmetric bilinear pairings for a predefined security level is generated by the provider device or a trusted entity based on a first generator (P1) selected from a first cyclic group (G1), on a second generator (P2) selected from a second cyclic group (G2) different to the first cyclic group (G1), on a first random number (α) and on a second random number (Y), wherein a number of elements of the public key set (PK) depends on a predefined number (n) of consumers,
wherein a number of receiver device keys (DKi) are generated by the provider device or the trusted entity based on the public key set (PK), on the second random number (Y) and on the predefined number (n) of consumers, wherein the number of receiver device keys (DKi) is equal or smaller than the predefined number (n) of consumers and wherein a size of each of the receiver device keys (DKi) is independent of the number (n) of consumers,
wherein the receiver device keys (DKi) are distributed to respective devices of a plurality of devices, including at least one receiver device, and wherein the instructions, when executed by the processor, are configured to cause the processor to perform operations comprising:
communicating with the plurality of devices including the at least one receiver device via a one-to-many communication channel;
storing a provider key (K) that is generated by the provider device or the trusted entity based on the public key set (PK), on an encryption random number (t), on the first random number (α) and on the predefined number (n) of consumers;
storing an envelope (ENV) that is generated by the provider device or the trusted entity based on the public key set (PK), on the encryption random number (t) and on the predefined number (n) of consumers;
distributing, via the one-to-many communication channel, the envelope (ENV) to the respective devices including the at least one receiver device;
performing at least one of encrypting or signing payload data employing the provider key (K) for producing protected payload data; and
distributing, via the one-to-many communication channel, the protected payload data to the respective devices including the at least one receiver device.

15. A receiver device for a one-to-many communication network, wherein the receiver device comprises
a processor,
memory and instructions stored on the memory,
wherein a public key set (PK) supporting asymmetric bilinear pairings for a predefined security level is generated based on a first generator (P1) selected from a first cyclic group (G1), on a second generator (P2) selected from a second cyclic group (G2) different to the first cyclic group (G1), on a first random number (α) and on a second random number (Y), wherein a number of elements of the public key set (PK) depends on a predefined number (n) of consumers,
wherein a number of receiver device keys (DKi) are generated based on the public key set (PK), on the second random number (Y) and on the predefined number (n) of consumers, wherein the number of receiver device keys (DKi) is equal or smaller than the predefined number (n) of consumers and wherein a size of each of the receiver device keys (DKi) is independent of the number (n) of consumers, and wherein the instructions, when executed by the processor, are configured to cause the processor to perform operations comprising:
receiving, via a secure communication channel, a respective receiver device key from the number of receiver device keys (DKi);
receiving communications from a provider device via a one-to-many communication channel;
receiving, via the one-to-many communication channel, an envelope (ENV);
generating a receiver key based on the respective receiver device key and the received envelope (ENV), the receiver key corresponding to a provider key (K) of the provider device;
receiving, via the one-to-many communication channel, protected payload data, which are encrypted and/or signed by the provider device employing the provider key (K); and
processing, including at least one of decrypting or authenticating, the protected payload data employing the receiver key.

16. A communication system for a one-to-many communication network, the communication system comprising a provider device and a receiver device,
wherein the receiver device comprises a first processor, first memory and first instructions stored on the first memory, and wherein the provider device comprises a second processor, second memory, and second instructions stored on the second memory,
wherein a public key set (PK) supporting asymmetric bilinear pairings for a predefined security level is generated by the provider device or a trusted entity based on a first generator (P1) selected from a first cyclic group (G1), on a second generator (P2) selected from a second cyclic group (G2) different to the first cyclic group (G1), on a first random number (α) and on a second random number (Y), wherein a number of elements of the public key set (PK) depends on a predefined number (n) of consumers,
a number of receiver device keys (DKi) are generated by the provider device or the trusted entity based on the public key set (PK), on the second random number (Y) and on the predefined number (n) of consumers, wherein the number of receiver device keys (DKi) is equal or smaller than the predefined number (n) of consumers and wherein a size of each of the receiver device keys (DKi) is independent of the number (n) of consumers,
the receiver device keys (DKi) are distributed to respective devices of a plurality of devices, including the receiver device, and wherein the second instructions, when executed by the second processor, are configured to cause the second processor to perform operations comprising:
communicating with the plurality of devices including the receiver device via a one-to-many communication channel;
storing a provider key (K) that is generated by the provider device or the trusted entity based on the public key set (PK), on an encryption random number (t), on the first random number (α) and on the predefined number (n) of consumers;
storing an envelope (ENV) that is generated by the provider device or the trusted entity based on the public key set (PK), on the encryption random number (t) and on the predefined number (n) of consumers;
distributing, via the one-to-many communication channel, the envelope (ENV) to the respective devices including the receiver device;
performing at least one of encrypting or signing payload data employing the provider key (K) for producing protected payload data; and
distributing, via the one-to-many communication channel, the protected payload data to the respective devices including the receiver device, and
wherein the first instructions, when executed by the first processor, are configured to cause the first processor to perform operations comprising:
receiving, via a secure communication channel, a respective receiver device key from the number of receiver device keys (DKi);
receiving communications from the provider device via the one-to-many communication channel;
receiving, via the one-to-many communication channel, the envelope (ENV);

generating a receiver key based on the received device key and the received envelope (ENV), the receiver key corresponding to the provider key (K) of the provider device;

receiving, via the one-to-many communication channel, the protected payload data, which are encrypted and/or signed by the provider device employing the provider key (K); and processing, including at least one of decrypting or authenticating, the protected payload data employing the receiver key.

17. A trusted entity for a communication system with a one-to-many communication network, wherein the trusted entity comprises a processor, memory, and instructions stored on the memory, wherein the instructions, when executed by the processor, are configured to cause the processor to perform operations comprising:

generating a public key set (PK) supporting asymmetric bilinear pairings for a predefined security level based on a first generator (P1) selected from a first cyclic group (G1), on a second generator (P2) selected from a second cyclic group (G2) different to the first cyclic group (G1), on a first random number ($\alpha$) and on a second random number (Y), wherein a number of elements of the public key set (PK) depends on a predefined number (n) of consumers;

generating a number of receiver device keys (DKi) based on the public key set (PK), on the second random number (Y) and on the predefined number (n) of consumers, wherein the number of receiver device keys (DKi) is equal or smaller than the predefined number (n) of consumers and wherein a size of each of the receiver device keys (DKi) is independent of the number (n) of consumers;

distributing, via a secure communication channel, the receiver device keys (DKi) to respective receiver devices;

generating a provider key (K) based on the public key set (PK), on an encryption random number (t), on the first random number ($\alpha$) and on the predefined number (n) of consumers;

generating an envelope (ENV) based on the public key set (PK), on the encryption random number (t) and on the predefined number (n) of consumer, wherein each of the receiver device keys (DKi) together with the envelope (ENV) enable the respective receiver devices to generate a respective receiver key, which corresponds to the provider key;

providing the provider key (K) to a provider device; and providing the envelope (ENV) to the respective receiver devices or to the provider device.

* * * * *